United States Patent [19]
Stott et al.

[11] 4,090,036
[45] May 16, 1978

[54] SATELLITE COMMUNICATIONS SYSTEM

[75] Inventors: Michael A. Stott, Ottawa; Russell J. Campbell, Kanata, both of Canada

[73] Assignee: Her Majesty the Queen in right of Canada, as represented by the Minister of National Defence, Ottawa, Canada

[21] Appl. No.: 763,207

[30] Foreign Application Priority Data

Feb. 9, 1976 Canada .................................. 245305

[22] Filed: Jan. 27, 1977

[51] Int. Cl.² ............................................... H04J 3/12
[52] U.S. Cl. .............................. 179/15 BY; 179/41 A; 325/4
[58] Field of Search ........... 179/41 A, 15 BY, 15 BZ; 325/4, 55, 64

[56] References Cited
U.S. PATENT DOCUMENTS

| | | | |
|---|---|---|---|
| 3,555,424 | 1/1971 | Malm | 179/41 A |
| 3,617,644 | 11/1971 | Boag | 179/41 A |
| 3,634,627 | 1/1972 | Velenhni | 179/41 A |

Primary Examiner—David L. Stewart
Attorney, Agent, or Firm—Sughrue, Rothwell, Mion, Zinn and Macpeak

[57] ABSTRACT

A satellite communications system provides automatic channel assignment without employing a dedicated signalling channel. A major station detects carrier-free forward channels and transmits on each a forward signal. A minor station hunts all available forward channels to ascertain and then monitor a carrier-free forward channel, detects the major station's forward signal and transmits a response signal on the corresponding carrier-free return channel while temporarily inhibiting reception by the minor station of any other signal from any other major station. The major station monitors all carrier-free return channels and detects the response signal to establish a link.

6 Claims, 3 Drawing Figures

SATELLITE COMMUNICATIONS SYSTEM

The present invention relates to a satellite communication system, and more particularly to a satellite communication system which enables an available communications channel to be assigned to a user automatically upon demand by the user.

Hitherto, two methods have been proposed for enabling a channel in a satellite communication system to be assigned to a user.

The first of these two previously proposed methods uses a central station, which the user calls on a dedicated signalling channel when the user wishes to begin transmission. The control station then selects a channel assignment and transmits this assignment to the user on another dedicated signalling channel. The user receives this assignment, uses the assigned channel, and informs the control station on a signalling channel when the user has finished his transmission.

The second previously proposed method does not use a control station. Instead, all of the users in the satellite communication system continually exchange information among themselves regarding which channels they are using. This exchange of information is accomplished by means of a sequence of time ordered signalling bursts from the users on a dedicated common signalling channel. When a user requires access to a transmission channel, he seizes an available channel and via the signalling channel, he informs the other users that he has done so.

It is a major disadvantage of both of these previously proposed systems that one or more dedicated signalling channels are required. This channel, or these channels, could otherwise be used for communications, and thus the satellite communication system as a whole has an inherent inefficiency, which must be reflected in the cost per channel.

The use of the central control system referred to above has disadvantages from a political or security point of view. In an international system, many nations find it to be undesirable to have their communications controlled by any other nation and, if the control station fails, the satellite communication system is inoperative.

The latter of the two methods referred to above, in which the users continuously exchange information among themselves regarding which channels they are using, requires a significant amount of complex equipment in each user's station, which is particularly undesirable in mobile applications involving ships or aircraft.

It is accordingly an object of the present invention to provide a satellite communication system having automatic assignment of channels on demand, and in which no communications channels are dedicated to system signalling for assignment of channels.

It is a further object of the present invention to provide a novel and improved satellite communication system which enables simple apparatus to be employed in a large number of small remote stations while employing any complex apparatus, which may be required, at one or at most only a few main station or stations.

According to the present invention, there is provided a satellite communication system comprising a plurality of minor stations, at least one major station for providing communication links with the minor stations through a plurality of forward and return channels, each of the major stations comprising first carrier detection means for detecting the presence of carrier waves on the return channels and for selecting those of the forward channels which are carrier-free, means for simultaneously transmitting a modulated carrier forward signal on each of the selected, carrier-free forward channels, and means for receiving a modulated carrier return signal on any of the return channels, and the minor station comprising second carrier detection means for detecting the presence of a carrier wave on any one of the forward channels, means for causing the second carrier detection means to hunt through the forward channels one at a time until the second carrier detection means detects one of the forward channels which is carrier free, means for detecting the forward signal on any of the forward channels, and means responsive to the forward signal for transmitting the return signal on one of the carrier-free return channels.

A minor station is typically a mobile, portable, transportable or fixed station which is equipped with sufficient means to provide a single two-way communications circuit.

A major station is typically a fixed station which is equipped with sufficient means to provide multiple two-way communications circuits and which may have access to multiple circuits in a switched telephone network.

A forward channel is a one-way channel from a major station to a minor station, and a return channel is a channel from a minor station to a major station.

Preferably, the means for transmitting the forward signal comprise means for transmitting an access request signal including a first address code identifying the minor station and a second address code identifying the major station, and the means for transmitting the return signal comprise means for transmitting a response signal including the first and second address codes, so that the return signal is responded to by only that major station which transmitted the access request signal.

The means for transmitting the forward signal may comprise means responsive to the response signal for transmitting a continuous carrier wave on the relevant forward channel, and means for modulating the continuous carrier wave. The transmission of the continuous carrier wave from the major station indicates to any other minor station in the system that the relevant forward channel has now become occupied, so that these other minor stations, which were previously monitoring that channel, begin to channel hunt.

The called minor station also preferably has means responsive to the access request signal for initiating transmission over the relevant return channel of a continuous carrier wave, which notifies all of the other major stations that this return channel is now occupied.

The minor station may comprise means for inhibiting its reception on the relevant forward channel, in response to the access request signal, for a time period sufficient for the relevant major station to initiate transmission of the continuous carrier wave by that major station.

The invention will be more readily understood from the following description of a preferred embodiment thereof given, by way of example, with reference to the accompanying drawings, in which.

Figure 1:
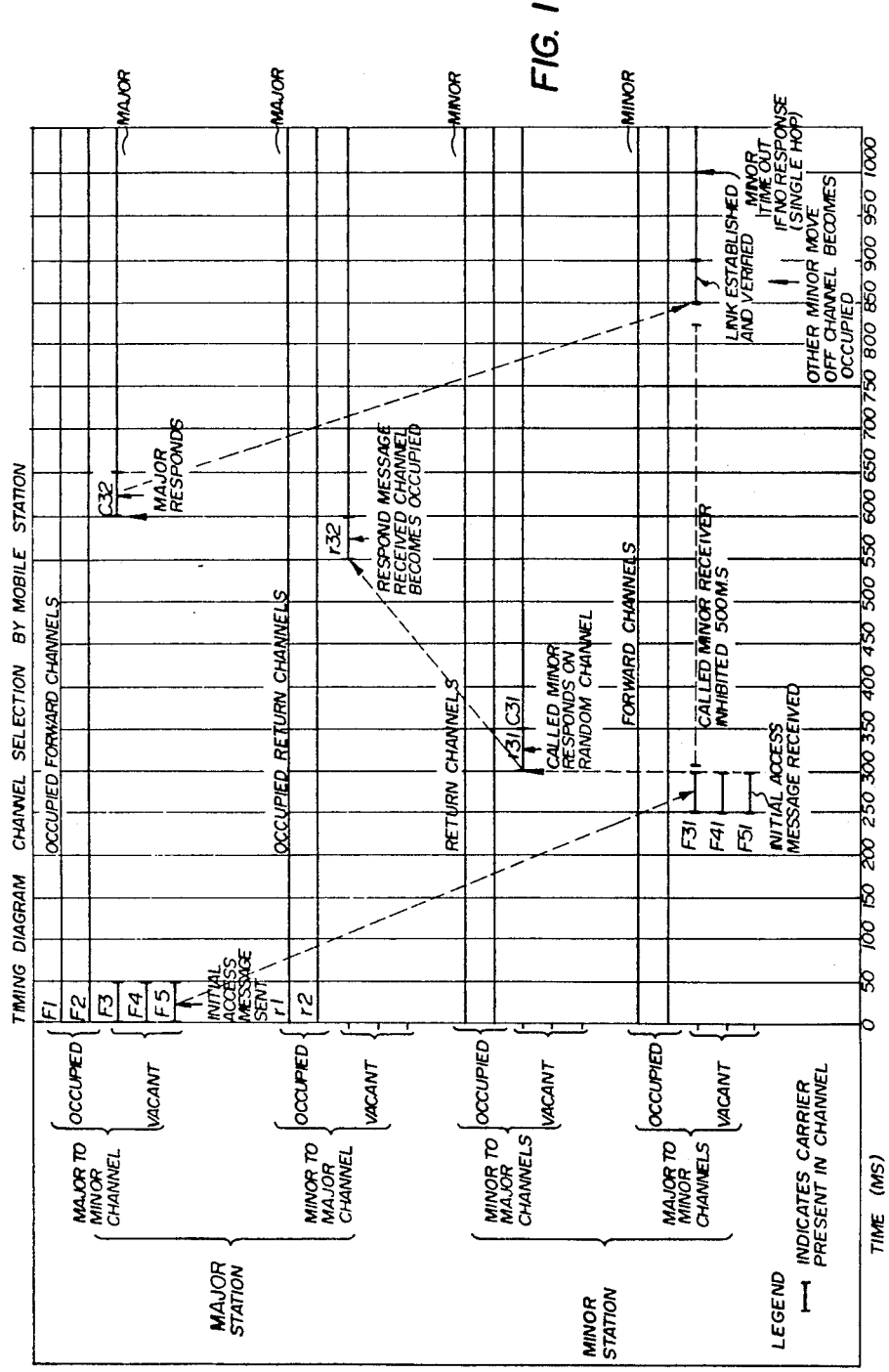
FIG. 1 shows a timing diagram illustrating automatic channel selection by a major station in a satellite communications system embodying the present invention.

The channel selection timing diagram shown in FIG. 1 illustrates the sequence of events in the allocation of forward and return channels between a major calling station and a minor satellite station. The time delays shown in FIG. 1 are approximate to a communication system employing a satellite at geosynchronoms altitude. The invention can, however, be used with satellites at other altitudes.

The components of the major station and the minor station will be described in greated detail hereinafter.

For the present, it should be understood that the minor station, while in a standby mode, hunts through the forward channels one at a time, either in sequence or randomly, until a foward channel is found which does not have a carrier wave in it.

The presence of a carrier in the channel for more than a predetermined length of time, typically 50ms, causes the hunting process to recommence, unless the minor station is transmitting, until a vacant channel is found.

If no free channel is available, the minor station remains in a continuous state of channel hunting.

The major station, which of course is one of a plurality of such stations, has as many transmitters as there are channels, and also has the ability to transmit and receive simultaneously on all channels. When in a standby mode, the major station monitors every free channel.

In the initial condition illustrated in FIG. 1, two of the forward channels, namely $f1$ and $f2$, and two of the return channels, namely $r1$ and $r2$, are occupied. That is to say, these channels are already is use, and continuous carrier waves are being transmitted through these channels.

When the major station wishes to establish a further, i.e. third, communication link, the major station transmits over all free channels, simultaneously, an access request signal containing an address code identifying the relevant minor station, an address code identifying the relevant major station, and a message type bit set to zero.

These three access request signals are indicated at $f3$, $f4$ and $f5$, and it will be seen that these signals have a duration of 50ms.

After 260ms from the start of the message, the three access request signals are received by the minor stations, as indicated by $f31$, $f41$ and $f51$, on the three otherwise unoccupied forward channels.

Since the addressed minor station is monitoring one of these unoccupied forward channels, it will detect the access request signal on that channel. More particularly, in the present instance it is assumed that, as shown in FIG. 1, the minor station detects the access request signal $f31$.

In response to the access request signal $f31$, the minor station transmits on one of the vacant return channels a response signal indicated at $r31$, followed by a continuous carrier wave, indicated at $c31$, the response signal $r31$ including an address code identifying the major calling station, an address code identifying the minor station, and a message type bit set to one.

Meanwhile, the major station is monitoring all of the vacant return channels. Consequently, the major station detects the response signal transmitted by the minor station, as indicated at $r32$.

In reply to the response signal, the major station initiates transmission of a forward signal in the form of a carrier $c32$ on the same channel as the initial access request signal $f3$ which was detected by the minor station.

In this way, a link is established and verified on this forward channel between the major station and the minor station.

The minor station incorporates means, initiated by reception and detection of the access request signal $f3$, for inhibiting reception on the relevant forward channel for a time period of 500ms, as indicated in FIG. 1, to prevent detection by the minor station on that forward channel of a different access request signal, from a different major station, before the link is established and verified as described above.

The transmission of the carrier wave $c31$ by the minor station notifies all of the other major stations that the relevant return channel is now busy.

The transmission of the carrier wave $c32$, by the relevant major station causes any other minor stations which were monitoring the relevant forward channel to commence hunting for a vacant forward channel.

In the case of a minor-to-major station call, the minor satellite station originating the call transmits the desired major station address code, followed by its own address code and a message type bit set equal to zero to indicate that the message is an access request message.

The called major station recognizes its own address on one of its free channels and responds on that channel with a message consisting of its own address code and the minor stations's address and the message type bit set to one to indicate that the message is in response to a request.

The major station then continues to transmit a carrier wave at the end of this response message.

The calling minor station receives the response message and a link is thus established.

Any other minor station which was monitoring this channel detects the continuous carrier and begins to hunt for another free channel using a pseudo-random selection technique which randomly distributes the vacant channels among the minor stations.

The calling minor station maintains a carrier on the channel, which notifies all other major stations that the channel is busy, and therefore these major stations cease to monitor this channel.

It will be appreciated that for each forward channel, there exists a predetermined return channel, and that two way communications are always provided.

Therefore, each minor station has frequency agility, and can transmit on any return channel and receive on the corresponding forward channel.

The apparatus for carrying out the above-described method will now be described with reference to FIGS. 2 and 3.

The components and operation of a typical minor station will now be described with reference to FIG. 2 of the drawings.

Figure 2:
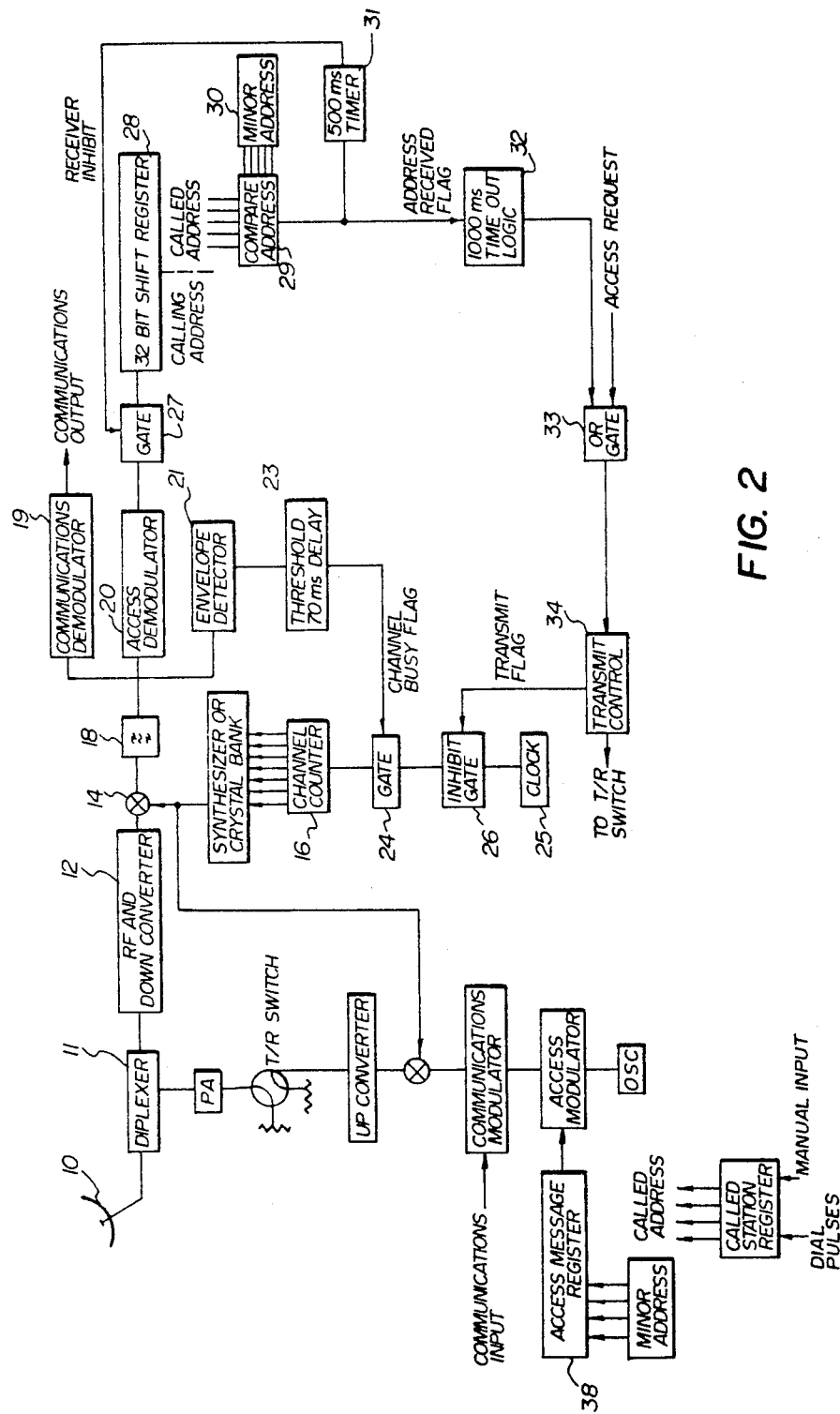
FIG. 2 shows a block diagram of a minor station for effecting the automatic channel selection illustrated in FIG. 1.

As shown in FIG. 2, an antenna 10 is connected through a diplexer 11 to an $rf$ stage and down converter 12. The composite spectrum of the in-use channels which is present at the output of the down converter 12 is fed to a mixer 14, and a local oscillator signal for the mixer 14 is generated by means of a frequency agile oscillator 15 whose frequency can be controlled by the contents of a channel count register 16.

Depending on the contents of the channel-count register 16, the oscillator frequency can be selected such that any one of the satellite channel frequencies fall within the pass band of a filter 18, which has a band width equal to the band width of one transmission channel.

The output of the band pass filter 18 is connected to a communications demodulator 19, an access demodulator 20 and an envelope detector 21.

The communications demodulator 19 is for use when a link has been established and communication with one of the major stations is occuring.

The purpose of the access demodulator 20 is to process incoming access messages, as described in greater detail below.

The envelope detector 21 is used to sense the carrier signal, and to operate a threshold and delay circuit 23 which operates so that, if a signal is present above a preset level for more than a preset length of time, which is typically slightly longer than the length of an access message, a control signal is generated by the threshold and delay circuit 23 and fed to a gate 24. This enables a clock signal, provided by clock 25 through an inhibit gate 26 to the gate 24, to be fed to the channel counter 16, which changes the contents of the channel-counter register. Consequently, the frequency of the local oscillator 14 is changed, and the output from the band pass filter 18 then corresponds to a different communications channel.

In this way, the envelope detector 21 and the threshold and delay circuit 23 cause the channel counter 16 and the local oscillator 14 to step through all the available channels until a channel is found which does not activate the threshold and delay circuit 23. The threshold and delay circuit 23 is then set corresponding to a channel with no carrier present.

Once such a channel has been found, the access demodulator 20 receives incoming access messages.

Since these incoming access messages are short in duration, as described hereinabove, they do not activate the threshold and delay circuit 23, which typically has a 70ms delay period.

The output of the access demodulator 20 is fed through a gate 27 and a shift register 28 to an address detector 29, in which the address in the access message is compared with a unique code assigned to the minor station and stored in a mobile address store 30.

If the address-comparison circuit 29 determines that the address in the access message corresponds with the stored address of the minor station, then the address-comparison circuit provides an output to a 500ms timer 31 which disables gate 27 for a period of 500ms to thereby disable the receiver.

The output from the address-comparison circuit, through a time out logic circuit 32 and an or gate 33, operates a transmitter control circuit 34, which has a transmitter output frequency controlled by the local oscillator 14 and transmits on the return link a frequency corresponding to that selected by the receiver.

The transmitter transmits a message consisting of the address of the calling station, which is obtained from the shift register 28 which accummulated the access message from the major or calling station, followed by the minor station's code.

The major station receives this message and, from a knowledge of the return link frequency used by the transmitter, proceeds to establish communications on the single forward communications link to which the receiver is tuned.

If the fixed station does not respond within a fixed time, which in present instance is selected as one second, the transmitted message is presumed lost and the system reverts to its original mode.

If the access request is originated at the minor station rather than the major station, the address of the major station to be called is loaded into an access message register 38, and a control signal is applied via an "access request" line, and the transmitter is energized so that an access message is transmitted on a vacant return channel.

The major station then responds and establishes communications on the corresponding forward channel. When the minor station is transmitting, the output of the clock 25 is inhibited by gate 26 to prevent changing of the channel frequency.

Figure 3:
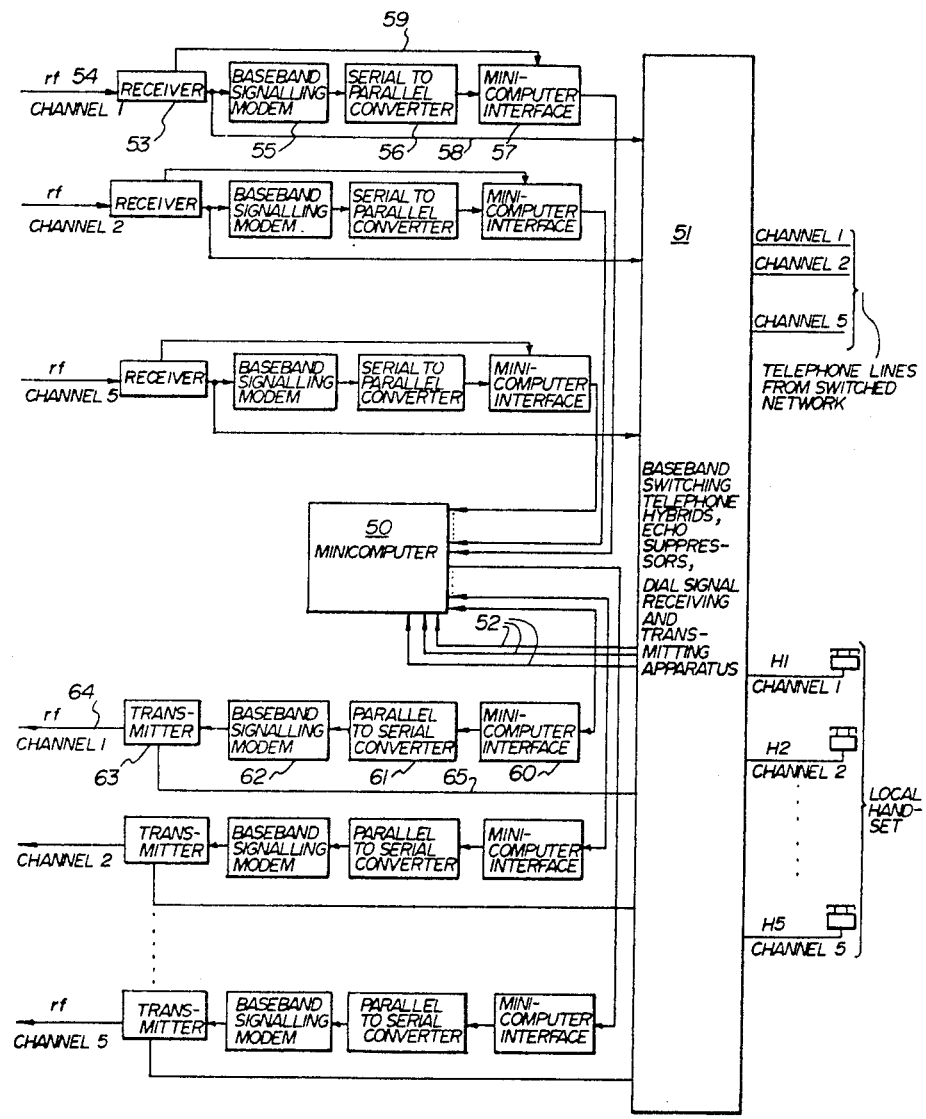
FIG. 3 shows a block diagram of a major station for use with the minor station of FIG. 2.

FIG. 3 illustrates a block diagram of a major station.

This major station is provided with a minicomputer 50 which performs all control functions, including access control signalling, modem control and base band switching control and all information processing.

Telephone lines $t1, t2 \ldots tn$ from a switched network, and local handsets $h1, h2 \ldots hn$ are connected to a base band switching unit 51, which incorporates telephone hybrids, echo suppressors and dial signal receiving and transmitting apparatus, and which is connected by dialing information lines 52 to the minicomputer 50. Five receivers 53 are connected by respective radio frequency input lines 54 to an antenna (not shown), each receiver 53 being connected through a signalling modem 55, a serial to parallel converter 56 and a minicomputer interface unit 57 to the minicomputer 50.

A radio frequency carrier detect line 59 is also connected between each receiver 53 and its respective minicomputer interface unit 57, and the output of each of the receivers 53 is connected through a respective base band signal line 58 to base band switching unit 51.

The outputs of the minicomputer 50 are each connected through a respective minicomputer interface unit 60, a parallel to serial converter 61, a signalling modem 62 and a transmitter 63 to a radio frequency line 64 extending to an antenna (not shown).

The base band switching unit is connected by base band signal lines 65 to the inputs of the transmitters 63.

To place a call from this major station, the user picks up one of the handsets $h1$ to $h5$ and dials the address of the minor station with which he wishes to communicate. The minicomputer 50 detects that a handset has been picked up, connects a dialling signal receiver and inserts a dial tone until the first digit of the address has been dialled.

The address information is received by the minicomputer 50, which then carries out the required signalling procedure to form a communication link with the remote minor station, and connects the handset to the channel when the channel assignment is complete.

When a call from a minor station is received, the minicomputer 50 processes the data from the minor station, carries out the signalling procedure with the minor station and rings a free one of the handsets $h1$ to $h5$.

A call from the switched network over telephone lines $t1$ to $tn$ is handled in a similar fashion to a call placed by a user employing one of the handsets $h1$ to $h5$ in the major station. The minicomputer 50 detects an incoming call from one of the telephone lines $t1$ through the base band switching unit 51, and controls the signalling to the minor station.

A call from a minor station to the switched network is handled in a similar fashion to a call placed from a minor station to the major station. The address received from the minor station is used to dial the number desired in the switched network.

Alternatively, the minor station can be connected with a free telephone line and can use Touch-Tone (Trade Mark) dialling to complete the call.

The embodiments of the invention in which an exclusive property or privilege is claimed are defined as follows:

1. A satellite communications system comprising:
   a plurality of minor stations;
   at least one major station for providing communication links with said minor stations through a plurality of forward and return channels;
   said major station comprising:
   first carrier detection means for detecting the presence of carrier waves on said return channels and for selecting those of said forward channels which are carrier free;
   means for simultaneously transmitting a modulated carrier forward signal in the form of an access request signal on each of said selected carrier-free forward channels; and
   means for receiving a modulated carrier return signal on any of said return channels; and
   said minor station comprising;
   second carrier detection means for detecting the presence of a carrier wave on any of said forward channels;
   means for causing said second carrier detection means to hunt through said forward channels one at a time until said second carrier detection means detects one of said forward channels which is carrier free;
   means for detecting said forward signal on said one of said forward channels;
   means responsive to said forward signal for transmitting said return signal on one of said carrier-free return channels; and means responsive to said forward signal for temporarily inhibiting reception on said one of said forward channels for a predetermined period of time sufficient to enable establishment of a communications link between said major and minor stations, whereby detection of a different access request signal by said minor station is prevented;
   said means for transmitting the forward signal comprising means for transmitting the access request signal with a first address code identifying the respective one of said minor stations and a second address code identifying said major station, and said means for transmitting said return signal comprising means for transmitting a response signal including the first and second address codes.

2. A satellite communications system as claimed in claim 1, wherein said means for transmittting the forward signal comprise means responsive to the response signal for transmitting a continuous carrier wave on said one of the forward channels, and means for modulating the continuous carrier wave.

3. A satellite communications system as claimed in claim 1, wherein said means for detecting the forward signal comprise means for storing the address of said minor station and means for comparing said stored address with said first address code, and said inhibiting means comprise gate means controlling the input of said comparing means and timer means responsive to the output of said comparing means of disabling said gate means.

4. A minor station suitable for use in a satellite communication system of the type in which a major station and a minor station establish a communication link by means of an access request signal having a first address code identifying said major station and a second address code identifying said minor station, a response signal also containing said first and second address codes and carrier waves for carrying message information, said minor station comprising:
   carrier detection means for detecting the presence of carrier waves on any one of a plurality of forward channels;
   means for causing said carrier detection means to hunt through said forward channels one at a time until said carrier detection means detects one of said forward channels which is carrier free;
   means for detecting an access request signal on said one of said forward channels;
   means responsive to said access request signal for transmitting a return signal on one of a plurality of carrier free return channels;
   means responsive to said access request signal for temporarily inhibiting reception on said one of said forward channels for a predetermined period of time sufficient to enable establishment of a communication link between said major and minor stations, whereby detection of a different access request signal by said minor station is prevented.

5. A minor station as claimed in claim 4, wherein said means for detecting the forward signal comprise means for storing the address of said minor station and means for comparing said stored address with said first address code, and said inhibiting means comprise gate means controlling the input of said comparing means and timer means responsive to the output of said comparing means for disabling said gate means.

6. A minor station as claimed in claim 4, further comprising:
   means for transmitting an access request signal on a carrier-free return channel; and
   means for receiving from said major station a response signal on a carrier-free forward channel.

* * * * *